(12) United States Patent
Mann

(10) Patent No.: US 9,624,806 B2
(45) Date of Patent: Apr. 18, 2017

(54) HEATABLE FLUID LINE AND CONNECTOR FOR A HEATABLE FLUID LINE

(71) Applicant: NORMA GERMANY GMBH, Maintal (DE)

(72) Inventor: Stephan Mann, Biebergemuend (DE)

(73) Assignee: NORMA GERMANY GMBH, Maintal (DE)

(*) Notice: Subject to any disclaimer, the term of this patent is extended or adjusted under 35 U.S.C. 154(b) by 214 days.

(21) Appl. No.: 14/579,277

(22) Filed: Dec. 22, 2014

(65) Prior Publication Data

US 2015/0240687 A1    Aug. 27, 2015

(30) Foreign Application Priority Data

Feb. 24, 2014 (DE) .................. 10 2014 102 353

(51) Int. Cl.
| | |
|---|---|
| *F24H 1/10* | (2006.01) |
| *F01N 3/20* | (2006.01) |
| *F16L 53/00* | (2006.01) |
| *F01N 3/28* | (2006.01) |
| *H05B 3/04* | (2006.01) |

(Continued)

(52) U.S. Cl.
CPC .......... *F01N 3/208* (2013.01); *F01N 3/2896* (2013.01); *F16L 53/008* (2013.01); *F24H 1/102* (2013.01); *H05B 3/04* (2013.01); *H05B 3/06* (2013.01); *F01N 3/2066* (2013.01); *F01N 2610/02* (2013.01); *F01N 2610/10* (2013.01); *F01N 2610/14* (2013.01); *F01N 2610/1486* (2013.01); *F16L 25/01* (2013.01)

(58) Field of Classification Search
None
See application file for complete search history.

(56) References Cited

U.S. PATENT DOCUMENTS

| | | | |
|---|---|---|---|
| 1,902,877 A * | 3/1933 | Baker | ................ F24H 1/102 392/485 |
| 3,387,364 A | 6/1968 | Boggs | |

(Continued)

FOREIGN PATENT DOCUMENTS

| | | |
|---|---|---|
| CN | 201129581 | 10/2008 |
| CN | 102597592 | 7/2012 |

(Continued)

OTHER PUBLICATIONS

Japanese Office Action issued in Patent Appl. No. 2015-024342, dated Jan. 19, 2016, along with an english translation thereof.

(Continued)

*Primary Examiner* — Thor Campbell
(74) *Attorney, Agent, or Firm* — Greenblum & Bernstein, P.L.C.

(57) ABSTRACT

A heatable fluid line having a tube and a connector at an end of the tube, the fluid line including an inlet channel with a longitudinal axis, and a heating rod arranged in the interior of the tube and projecting laterally out of the connector through an outlet channel at a predetermined angle to the longitudinal axis. A seal is arranged between the heating rod and the connector in an accommodation space that includes a circumferential wall. An arrangement is provided that centers the heating rod and a seal in relation to one another to seal the heating rod. as it is guided laterally outwards.

8 Claims, 2 Drawing Sheets

(51) Int. Cl.
*H05B 3/06* (2006.01)
*F16L 25/01* (2006.01)

(56) References Cited

U.S. PATENT DOCUMENTS

| | | | | |
|---|---|---|---|---|
| 3,754,118 A * | 8/1973 | Booker | ............... | H05B 3/82 138/89 |
| 4,124,039 A * | 11/1978 | St. Laurent | ......... | F16L 53/002 138/35 |
| 4,423,311 A * | 12/1983 | Varney, Sr. | ............. | E03B 7/14 138/33 |
| 4,917,539 A * | 4/1990 | de la Salle | ............ | F16L 41/06 137/318 |
| 5,182,792 A * | 1/1993 | Goncalves | ........... | E21B 17/203 166/60 |
| 5,640,951 A * | 6/1997 | Huddart | ............... | A61M 16/08 128/203.26 |
| 5,859,953 A * | 1/1999 | Nickless | .............. | F16L 53/008 138/33 |
| 5,872,890 A * | 2/1999 | LaCombe | .............. | F24H 1/102 392/487 |
| 6,456,785 B1 * | 9/2002 | Evans | .................... | F24H 1/102 392/448 |
| 6,914,190 B2 * | 7/2005 | Dunand | ............... | H02G 3/0468 174/71 R |
| 7,162,149 B2 * | 1/2007 | Evans | .................... | F22B 1/282 392/386 |
| 7,424,211 B2 * | 9/2008 | Lehmann | .............. | F01M 5/001 392/314 |
| 7,721,766 B2 * | 5/2010 | Sawada | ................ | H05B 3/58 138/121 |
| 8,028,721 B2 * | 10/2011 | Koskey, Jr. | ........... | F16L 53/008 138/32 |
| 8,180,207 B2 * | 5/2012 | Shirai | ...................... | E03D 9/08 392/465 |
| 8,238,733 B2 * | 8/2012 | Sawada | ................ | F16L 53/008 138/33 |
| 8,291,939 B2 * | 10/2012 | Ferrone | ................. | A01K 7/027 138/104 |
| 9,433,344 B2 * | 9/2016 | Avitsian | ................ | A61B 1/126 |
| 2008/0012293 A1 | 1/2008 | Freiberger et al. | | |
| 2008/0028512 A1 * | 2/2008 | Hughson | ............... | F24H 9/2028 4/541.3 |
| 2008/0271801 A1 * | 11/2008 | Sonderegger | ............ | H05B 3/58 138/33 |
| 2009/0266435 A1 * | 10/2009 | Ferrone | ................. | A01K 7/027 138/33 |
| 2011/0241333 A1 | 10/2011 | Borgmeier et al. | | |
| 2012/0141100 A1 * | 6/2012 | Evans | .................... | F24H 1/142 392/485 |
| 2012/0291880 A1 | 11/2012 | Eckardt et al. | | |

FOREIGN PATENT DOCUMENTS

| | | |
|---|---|---|
| CN | 102788207 | 11/2012 |
| DE | 19754163 | 4/1999 |
| DE | 10 2011 102 244 | 11/2012 |
| DE | 102011102244 | 11/2012 |
| EP | 0068688 | 6/1981 |
| EP | 0068688 | 1/1983 |
| EP | 1070642 | 1/2001 |
| JP | 58-2463 | 1/1983 |
| JP | 8-320096 | 12/1996 |
| JP | 2007-211979 | 8/2007 |
| JP | 2010-501799 | 1/2010 |
| JP | 2012-247059 | 12/2012 |
| KR | 10-2012-0130047 | 11/2012 |
| WO | 2008/023021 | 2/2008 |

OTHER PUBLICATIONS

Russian Office Action issued in Patent Appl. No. 2014153266/06(085115), dated Jan. 14, 2016, along with an English language translation thereof.

Korean Office Action issued in Patent Appl. No. 10-2015-0018809, dated Apr. 5, 2016, along with an English translation thereof.

European Search Report for Application No. 14199758.5 mailed Jul. 3, 2015 with English Translation thereof.

Chinese Office Action issued in Patent Application No. 201510052394.X, dated Jun. 3, 2016, along with an english translation thereof.

* cited by examiner

HEATABLE FLUID LINE AND CONNECTOR FOR A HEATABLE FLUID LINE

CROSS-REFERENCE TO RELATED APPLICATIONS

The present application claims priority under 35 U.S.C. §119(a) of German Patent Application No. 10 2014 102 353.6 filed Feb. 24, 2014, the disclosure of which is expressly incorporated by reference herein in its entirety.

BACKGROUND

1. Field of the Invention

The present invention relates to a heatable fluid line having a tube, a connector that is arranged at an end of the tube and comprises an inlet channel with a longitudinal axis, and a heating rod that is arranged in the interior of the tube and projects laterally out of the connector through an outlet channel at a predetermined angle to the longitudinal axis, wherein a seal is arranged between the heating rod and the connector in an accommodation space which comprises a circumferential wall.

Furthermore, the invention relates to a connector for a heatable fluid line with an inlet channel having a longitudinal axis, a lateral outlet channel running at a predetermined angle to the longitudinal axis, and an accommodation space for a seal, which space connects to the outlet channel and comprises a circumferential wall with a center axis, wherein a seal is positionable in the accommodation space.

2. Description of the Background

A heatable fluid line and a connector for a heatable fluid line of this type are known from DE 10 2011 102 244 A1.

The invention is explained below on the basis of a fluid line that is used in order to transport urea from a supply container to a point of use. UREA is used, for example, in diesel engines in order to reduce the emission of nitrogen oxides.

If a fluid line of this type is installed in a motor vehicle, then at low outside temperatures, there is the risk of the urea freezing in the fluid line so that it is no longer flowable. It is therefore known to heat the fluid line and the connector.

If the connector comprises an inlet channel running in a straight line, that is, if the inlet channel continues into the outlet channel without changing direction, then the heating rod must be guided laterally out of the connector. Here, angles of 20° to 80° to the longitudinal axis are typical. The heating rod must be sealed at the outlet out of the connector in order to prevent a leakage of the heated fluid. To create the seal, a seal is used that is arranged in an accommodation space that connects to the outlet channel. This seal, which can for example be embodied as a toroidal sealing ring or O-ring, bears tightly against the heating rod and tightly against the circumferential wall, so that a leakage of fluid out of the connector through the outlet channel should not be possible.

However, it has been shown that this sealing function is not always performed with the necessary reliability.

SUMMARY

The object of the invention is to reliably seal a heating rod guided laterally out of the connector.

This object is attained for a heatable fluid line of the type named at the outset in that means are provided which center the heating rod and seal relative to one another.

The problems with creating the seal have been traced back to the heating rod, which enters into the inlet channel of the connector roughly parallel to the longitudinal axis and then exits through the outlet channel at the predetermined angle to the longitudinal axis, not readily being centrally arranged in the outlet channel. To make it at all possible to install the heating rod, the outlet channel must have a cross section that is somewhat larger than the cross section of the heating rod. If the heating rod is no longer centrally arranged in the outlet channel, then a circumferential section of the seal is subjected to increased pressure and overcompressed, as it were, while another circumferential section is subjected to a lower pressure so that the tightness overall cannot be ensured with the necessary reliability. If means are then provided for centering this heating rod and the seal relative to one another, then the tightness problem is solved in a simple manner. All circumferential sections of the seal are then compressed in the same manner, so that overcompressions or undercompresssions do not occur in any circumferential section.

Preferably, the circumferential wall has a center axis that is laterally offset from a center axis of the outlet channel. The accommodation section and the outlet channel are then no longer coaxially arranged. It is thus possible to account for the actual position of the heating rod in the outlet channel.

Here, it is preferred that the center axis of the circumferential wall is offset from the center axis of the outlet channel in the direction of the longitudinal axis. The internal stress of the heating rod, which the rod has after being deflected out of the inlet channel into the outlet channel, is thus taken into account. A pre-bending of the heating rod can be omitted.

Preferably, the center axis of the circumferential wall is offset from the center axis of the outlet channel by less than 0.5 mm. The offset can thus be relatively small. For example, it can be 2, 3, 4 or 5 tenths of a millimeter or intermediate values thereof.

Alternatively or additionally to the eccentric arrangement of the circumferential wall of the accommodation space and the outlet channel, it can also be provided that, in the accommodation space, a supporting ring is arranged which is braced by the circumferential wall and positions the heating rod relative to the seal. This supporting ring can be braced against the stress produced by the bend of the heating rod and thus position the heating rod relative to the seal.

Preferably, a ramp element is arranged in the inlet channel, which element comprises a guide surface pointing out of the inlet channel to the outlet channel. The heating rod can then be inserted into the connector through the inlet channel. The heating rod then strikes the guide surface of the ramp element and is thus deflected towards the outlet channel. It subsequently exits out of the outlet channel and the accommodation space for the seal. It virtually cannot be avoided that the heating rod is thereby no longer positioned centrally to the seal during the passage through the accommodation space as a result of a certain inherent stiffness. This problem, which would otherwise cause the risk of a leakage, is remedied by the means, that is, the eccentricity of the circumferential wall and outlet channel and/or the supporting ring.

The object is attained for a connector of the type named at the outset in that the center axis of the circumferential wall is offset from the center axis of the outlet channel and/or a supporting ring is arranged in the accommodation space, which ring is braced by the circumferential wall.

With an embodiment of this type, it is possible to pre-compensate, as it were, the problem of the heating rod not automatically being not concentrically positioned in the outlet channel due to its inherent stiffness. It is thus possible to achieve an improved seal at the position where the heating rod exits out of the connector.

Preferably, the center axis of the circumferential wall is offset from the circumferential wall of the outlet channel in the direction of the longitudinal axis. A pre-bending of the heating rod can thus be spared.

Preferably, the center axis of the circumferential wall is offset from the circumferential wall from the center axis of the outlet channel by maximally 0.5 mm. This small offset is sufficient to eliminate the problems with the eccentricity of the heating rod in the outlet channel.

BRIEF DESCRIPTION OF THE DRAWINGS

The invention is described below on the basis of a preferred exemplary embodiment in connection with the drawing. Wherein.

DETAILED DESCRIPTION

Figure 1:
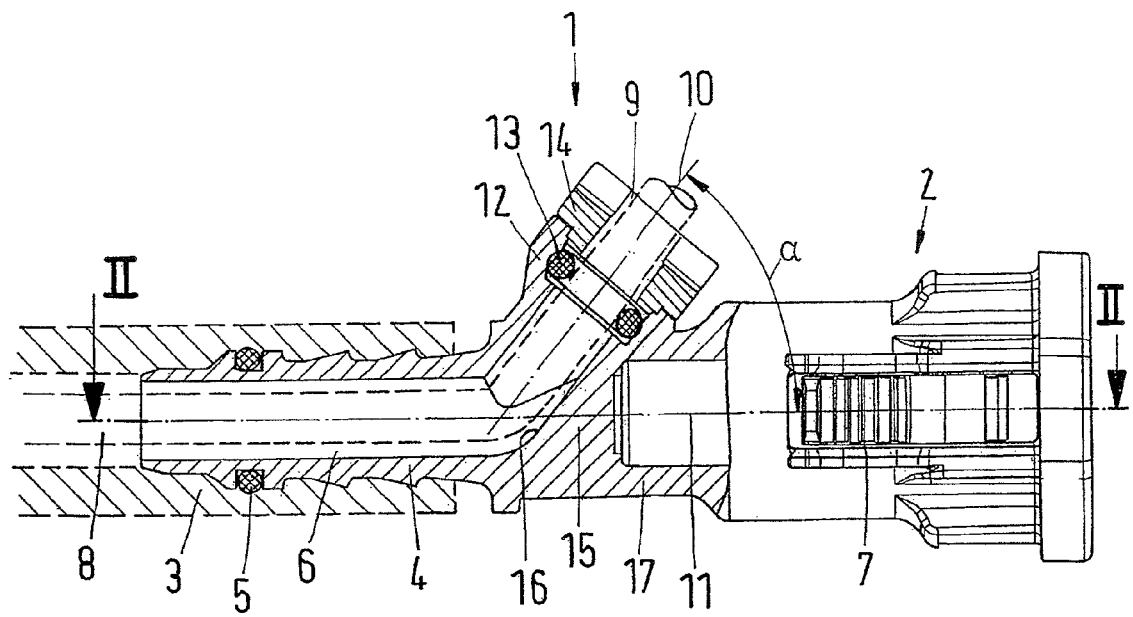
FIG. 1 shows a schematic longitudinal section through an end of a heatable line.

FIG. 1 shows a heatable fluid line 1 having a connector 2 and a tube 3. The tube is flexible. It can be formed from an extruded plastic or from a hose material. In the following, a hose is also to be denoted by the term "tube."

The tube 3 is attached to a connecting piece 4 of the connector and sealed there by an O-ring 5. The connecting piece 4 has on its outside a fir tree profile. If necessary, the tube 3 can also be secured on the connecting piece 4 with the aid of a plastic overmold.

Figure 2:
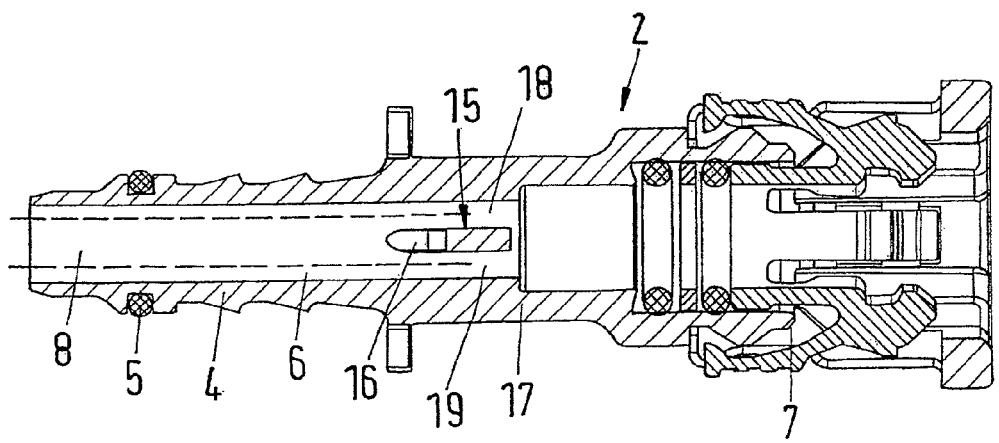
FIG. 2 shows a section II-II according to FIG. 1.

An inlet channel 6 is guided through the connecting piece 4, which channel runs in a straight line through the entire connector and, as can be seen in FIG. 2, is guided up to a connection geometry 7. With the connection geometry 7, the connector 2 can be attached to a connecting piece of another line, tank or unit. The exact shape of the connection geometry 7 does not play a role in the present case. However, it should be embodied in such a manner that a connection between the connector 2 and a connecting piece has a sufficient strength and tightness.

A heating rod 8, shown dashed, is arranged as a heating element in the free cross section of the tube 3. The heating rod 8 comprises at least one heating conductor that is embedded in an extruded plastic material. Preferably, two heating conductors are provided which are connected to one another at an end located at a distance from the connector 2, so that an electrical supply is only necessary at one end of the heating rod 8. Although the heating rod 8 is flexible and bendable, it has certain inherent stiffness, so that the heating rod 8 can be slid into the inlet channel 6 in the connecting piece 4 when the tube 3 (with the heating rod 8 located therein) is slid onto the connecting piece 4.

The heating rod 8 should exit the connector 2 before it reaches the connection geometry 7, so as not to disturb a connection produced with the aid of the connection geometry 7. Accordingly, the connector comprises an outlet channel 9, the longitudinal axis 10 of which lies at an angle α to the longitudinal axis 11 of the inlet channel 6. The angle α is greater than 0° and is preferably within the range of 20° to 80°.

The outlet channel 9 is arranged in a neck 12, which is directed to the longitudinal axis 11 of the inlet channel 6 at the angle α. An O-ring 13 is provided in the neck 12. The O-ring 13 bears against the heating rod 8 in a sealing manner and prevents a leakage of fluid out of the outlet channel. The O-ring 13 is secured in the outlet channel 9 with the aid of a plug 14 that is arranged in the neck 12. However, the plug 14 merely holds the O-ring in place. It therefore does not compress the O-ring.

The ramp element 15 comprises a guide surface 16 that is curved, that is, embodied in a kink-free manner. The guide surface 16 extends from the "underside" of the inlet channel 6, that is, from the side which lies opposite of the outlet channel 9, up to the outlet channel 9 and continues in a wall of the outlet channel 9. The tip of the heating rod 8 can thus slide along the guide surface 16 without being impeded by steps, kinks, grooves or the like. If the heating rod 8 is inserted into the inlet channel 6 through the connecting piece 4, then the tip is deflected by the guide surface 16 of the ramp element 15 such that it automatically enters into the outlet channel 9.

The production of a heatable fluid line 1 with a connector 2 of this type is relatively simple. The tube 3 must merely be prefabricated with the heating rod 8 so that the heating rod 8 projects out of the tube 3 with a predetermined length. Thus, the heating rod 8 already enters into the inlet channel 6 in the interior of the connecting piece 4 before the tube 3 is slid onto the connecting piece 4. If the tube 3 and the heating rod 8 are then further moved together, in order to slide the tube 3 onto the connecting piece 4, then the tip of the heating rod 8 is deflected by the guide surface 16 on the ramp element 15 so that this tip enters into the outlet channel 9 and can exit out of the connector 2 there.

Of course, it is also possible to first insert only the heating rod 8 into the connector 2 and to then guide the tube 3 over the heating rod 8 and slide it onto the connecting piece 4.

To accommodate the O-ring 13, that is, the seal, an accommodation space 20 is provided which comprises a circumferential wall 21. The O-ring 13, that is, the seal, should bear with a predetermined prestress against the heating rod 8 on the radially inner side and against the circumferential wall 21 on the radially outer side. The stress should thereby run in a roughly uniform manner in the circumferential direction.

The heating rod 8, however, is normally not centrally positioned in the outlet channel 9. The heating rod 8 has a certain inherent stiffness. This inherent stiffness does allow a bending of the heating rod when it is slid over the guide surface 16 of the ramp element 15 into the outlet channel 9. However, because of the inherent stiffness, the heating rod 8 attempts to maintain its extended position. This causes the heating rod 8 to no longer be positioned concentrically in the outlet channel 9, but rather to have a more pronounced tilt towards the longitudinal axis of the inlet channel 11. Without additional measures, this causes a circumferential region of the O-ring 13 to be more heavily compressed, while a region of the O-ring 13 diametrically opposed thereto is less heavily compressed. This overcompression and undercompression of the O-ring 13 leads to the risk of a leakage.

Figure 3:
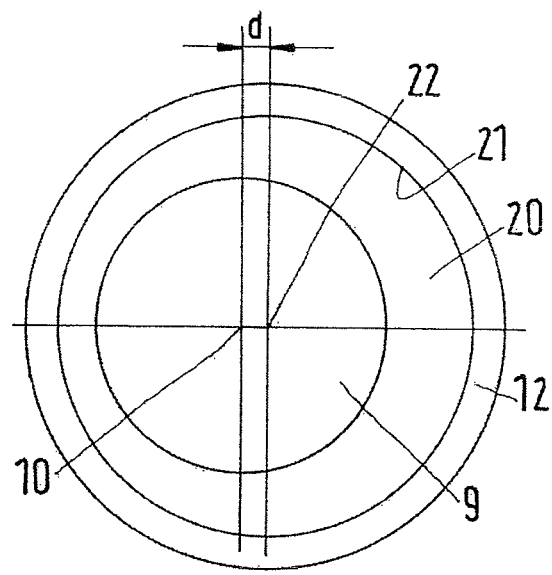
FIG. 3 shows a schematic top view of the outlet channel.
Figure 4:
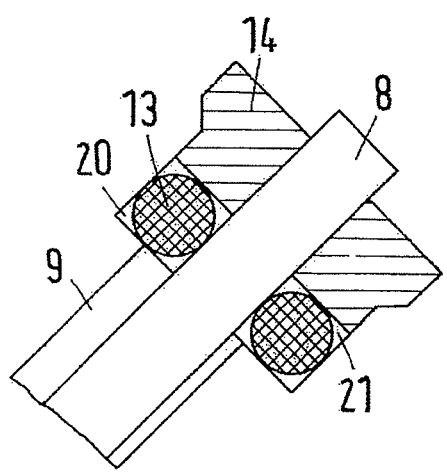
FIG. 4 shows an enlarged partial view from FIG. 1.

To avoid this risk, the eccentricity of the heating rod 8 in the outlet channel 9 is pre-compensated, as it were. One option for this is that the outlet channel 9 and the accommodation space 20 are arranged eccentrically to one another, as illustrated in FIGS. 3 and 4. In other words, the circumferential wall 21 has a center axis 22 that is laterally offset to the center axis 10 of the outlet channel 9, namely in the direction of the longitudinal axis 11. As can be seen from FIG. 4, it is thus achieved that the O-ring 13 is arranged in the accommodation space 20 such that it is subjected to pressure in a roughly uniform manner in all circumferential sections.

Figure 5:
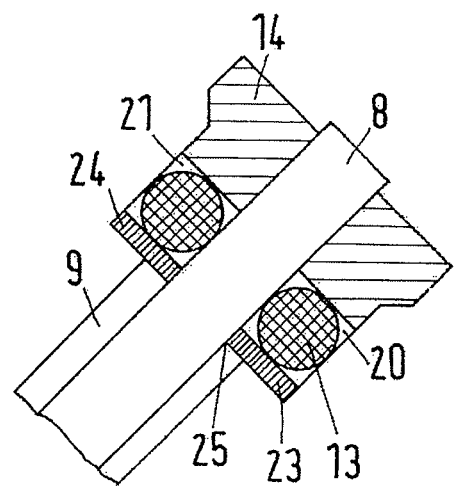
FIG. 5 shows a modified embodiment of FIG. 4.

The two center axes 10, 22 have an offset d that is illustrated at an exaggerated size in FIGS. 3 and 4. In many cases, it is sufficient if the center axis 22 of the circumferential wall is offset from the center axis 10 of the outlet channel 9 by maximally 0.5 mm, for example, 0.3 mm. Another option that can be used additionally or alternatively thereto is to arrange a supporting ring 23 in the accommodating space 20. This supporting ring can then be sized such that it can, on the one hand, be inserted into the accommodation space 20 with a small play, but such that it ensures, on the other hand, a position of the heating rod 8 in which the O-ring 13 is exposed to a uniform compression over its entire circumference. For this purpose, it essentially suffices if the supporting ring 23 can be braced by the region of the circumferential wall 21 that is, or would be without any additional measures, most closely adjacent to the heating rod 8. With reference to FIG. 5, this is the right side of the circumferential wall 21. In contrast, a play 24 between the supporting ring 23 and the circumferential wall 21 can be present on the opposite side of the circumferential wall 21. Because of this play 24, it can be advantageous if the accommodation space 20 and the outlet channel 9 are also arranged eccentrically to one another in this embodiment. Alternatively thereto, an opening 25 in the supporting ring 23, through which opening the heating rod 8 is guided, can also be arranged eccentrically.

The invention claimed is:

1. A heatable fluid line comprising:
   a tube;
   a connector arranged at an end of the tube;
   an inlet channel having a longitudinal axis; and
   a heating rod arranged in an interior of the tube and projecting laterally out of the connector through an outlet channel at a predetermined angle to the longitudinal axis;
   a seal arranged between the heating rod and the connector in an accommodation space defined, at least in part, by a circumferential wall; and
   the heating rod and the seal being centered in relation to one another;
   the circumferential wall having a center axis laterally offset from a center axis of the outlet channel.

2. A heatable fluid line according to claim 1, wherein:
   the center axis of the circumferential wall is offset from the center axis of the outlet channel in the direction of the longitudinal axis.

3. A heatable fluid line according to claim 1, wherein:
   the center axis of the circumferential wall is offset from the center axis of the outlet channel by maximally 0.5 mm.

4. A heatable fluid line according to claim 1, wherein:
   in the accommodation space, a supporting ring is arranged that is braced by the circumferential wall and positions the heating rod in relation to the seal.

5. A heatable fluid line according to claim 1, wherein:
   in the inlet channel, a ramp element is arranged that comprises a guide surface extending from the inlet channel to the outlet channel.

6. A connector for a heatable fluid line, said connector comprising:
   an inlet channel having a longitudinal axis;
   a lateral outlet channel extending at a predetermined angle to the longitudinal axis;
   an accommodation space for a seal, said space connecting to the outlet channel and comprises a circumferential wall with a center axis;
   a seal positioned in the accommodation space;
   the center axis of the circumferential wall being offset from the center axis of the outlet channel and/or a supporting ring being arranged in the accommodation space, with said ring being braced by the circumferential wall.

7. A connector according to claim 6, wherein:
   the center axis of the circumferential wall is offset from the center axis of the outlet channel in a direction of the longitudinal axis.

8. A connector according to claim 6, wherein:
   the center axis of the circumferential wall is offset from the center axis of the outlet channel by maximally 0.5 mm.

* * * * *